United States Patent
Irvin

(10) Patent No.: US 6,360,101 B1
(45) Date of Patent: Mar. 19, 2002

(54) CELLULAR PHONE THAT DISPLAYS OR SENDS MESSAGES UPON ITS ARRIVAL AT A PREDETERMINED LOCATION

(75) Inventor: David R. Irvin, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/223,904

(22) Filed: Dec. 31, 1998

(51) Int. Cl.$^7$ ................................ H04Q 7/20
(52) U.S. Cl. ............... 455/456; 455/457; 455/459; 701/208; 701/201; 701/211; 342/357
(58) Field of Search ................ 455/456, 457, 455/459; 701/208, 201, 211; 340/995, 996, 902, 904, 905; 379/133; 342/457; 370/328, 312

(56) References Cited

U.S. PATENT DOCUMENTS

| | | | | |
|---|---|---|---|---|
| 4,190,819 A | * | 2/1980 | Burgyan | 340/23 |
| 5,677,837 A | * | 10/1997 | Reynolds | 455/456 |
| 5,736,940 A | * | 4/1998 | Burgener | 340/994 |
| 5,790,974 A | * | 8/1998 | Tognazzini | 701/204 |
| 6,049,711 A | * | 4/2000 | Ben-Yehezkel et al. | 455/414 |
| 6,085,148 A | * | 7/2000 | Jamison et al. | 701/211 |
| 6,088,594 A | * | 7/2000 | Kingdon et al. | 455/457 |
| 6,177,905 B1 | * | 1/2001 | Welch | 342/357.13 |

* cited by examiner

*Primary Examiner*—Thanh Cong Le
*Assistant Examiner*—Lana Le
(74) *Attorney, Agent, or Firm*—Coats & Bennett, P.L.L.C.

(57) ABSTRACT

A mobile communication device, such as a cellular telephone, determines its current location and compares the current location to one or more target locations stored in a target location memory. When the current location of the mobile communication terminal is within one of the target locations in memory, the mobile communication terminal annunciates its arrival by generating an audible alarm, or displays or transmits a predetermined arrival message associated with the target location. In one embodiment of the invention, target location data is determined entered manually via a keypad. In another embodiment, the target location data is obtained from a positioning receiver or a server connected to the communications network and loaded into the target location memory.

22 Claims, 5 Drawing Sheets

CELLULAR PHONE THAT DISPLAYS OR SENDS MESSAGES UPON ITS ARRIVAL AT A PREDETERMINED LOCATION

FIELD OF THE INVENTION

The present invention relates generally to methods for determining the location of a mobile station in a cellular communication system and, more particularly, to a cellular telephone that is programmed to take some action based upon its arrival at a predetermined location.

BACKGROUND OF THE INVENTION

It is a common practice for a person to place notes in their vehicle to remind them to perform certain tasks. For example, a person may place a note in their vehicle to remind them to pick up groceries on the way home from work. The method most frequently used is to write a note on a sticky note or loose piece of paper which is placed in a location in the vehicle so that it will be seen when the person enters the vehicle. For example, it is common to "stick" notes to an instrument panel or steering wheel, or place notes on loose pieces of paper in a vehicle seat. This method, however, is not foolproof. It is possible that the note will not remain in its original location. For example, a "sticky" note may detach from its original location and fall to the floorboard of a vehicle. Also, a note placed in a vehicle seat may be covered by other articles, or be blown when the door to the vehicle is opened. If the note does not remain in its original location, or if it is covered before it is seen by the user, it will not be effective.

It is also desirable in many cases for a person to periodically call the home or office while traveling to inform family members of their safe arrival, or to inform co-workers of their location for business reasons. However, a person may not always remember to call the home or office when arriving at the designated location. Also, the individual may be hurried when arriving at the predetermined location and not have sufficient time to call to report their arrival.

SUMMARY OF THE INVENTION

The present invention provides a mobile communication device, such as a cellular telephone, that displays or sends messages when it arrives at a predetermined destination. The phone may be used, for example, to store messages that the user wants to be displayed or sent to another party when the user arrives at predetermined locations. The phone includes a positioning receiver, such as a GPS receiver, and a target location memory. One or more predetermined target locations are stored in the target location memory. The phone periodically determines its current location based on a position signal received by the positioning receiver, and compares its current location to the predetermined target locations stored in memory. The phone is programmed to take some predetermined action when it arrives at the predetermined location or at a predetermined distance from the target location. For example, the phone can annunciate its arrival by sounding an alarm, display a stored message on the phone's display, or transmit the stored message to a remote station.

The phone of the present invention has many applications. For example, the user may want to be reminded when he or she arrives at a known location so that some tasks can be performed. The user can store a reminder in the phone which will be displayed when the user arrives at the target location. Also, it may be desirable in some cases to transmit a message to another party when the user arrives at the predetermined target location. For example, the user may want to notify another person when the user arrives at predetermined locations so that the other party will know that the user safely arrived. In this case, the user stores one or more predetermined locations in memory along with a corresponding arrival message. As the user arrives in each location, the corresponding arrival message is transmitted to the other party.

The present invention avoids the age-old problem of writing reminders on note pads, sticky notes, or other pieces of paper which can be lost or overlooked. Also, the present invention avoids the problem of having to stop to notify another person when the user has arrived at certain predetermined location.

DETAILED DESCRIPTION OF THE INVENTION

Figure 1:
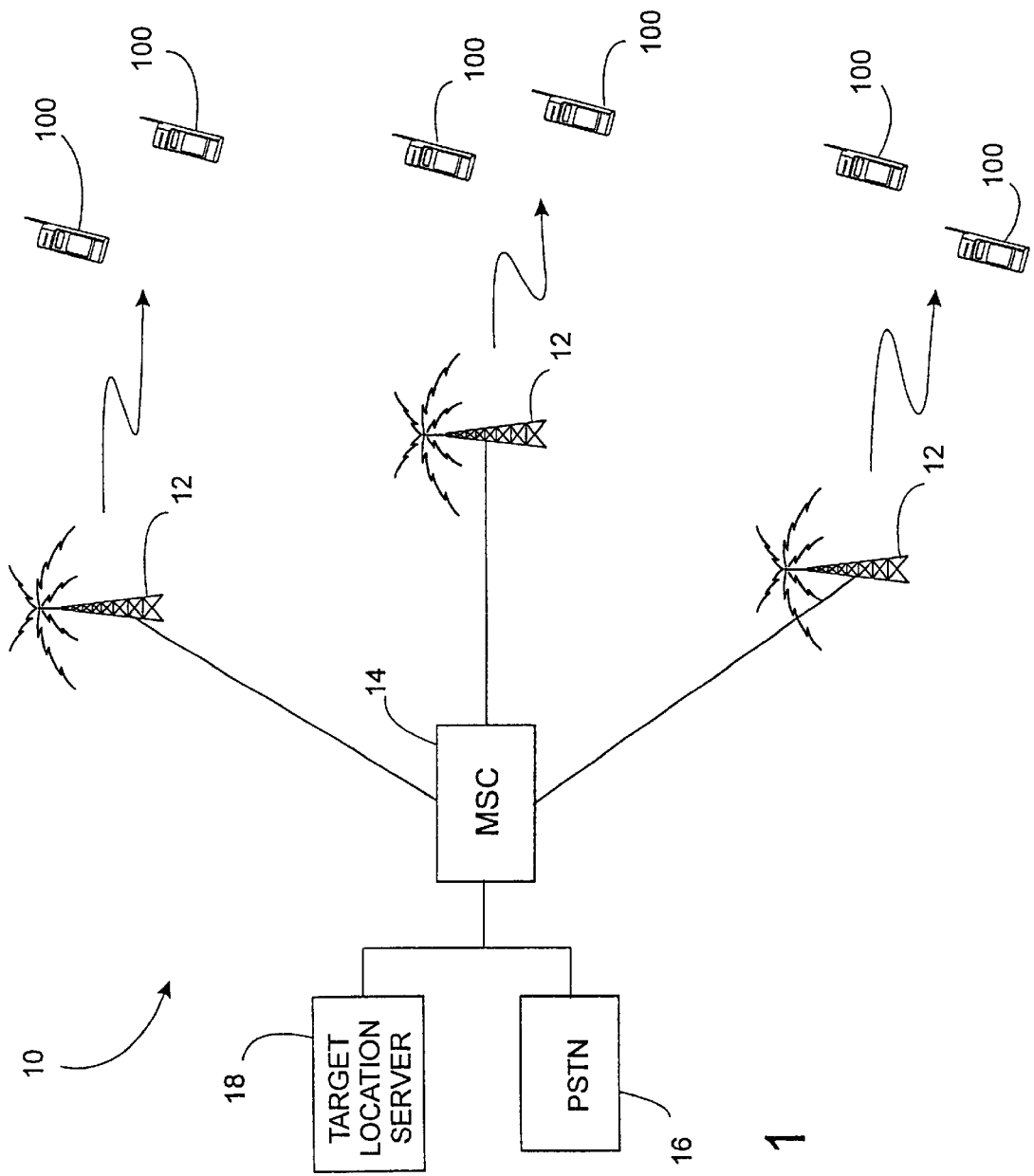
FIG. 1 is a block diagram of a cellular communication network.

Referring now to the drawings, and particularly to FIG. 1, a mobile communication system is shown. The mobile communication system, which is indicated generally by the numeral 10, comprises a plurality of base stations 12 which are connected via a mobile services switching center (MSC) 14 to a terrestrial communications network such as the Public Switched Telephone Network (PSTN) 16. Each base station 12 is located in and provides service to a geographic region referred to as a cell. In general, there is one base station 12 for each cell within a given network. Within each cell, there may be a plurality of mobile communication terminals 100 that communicate via radio link with the base station 12. The base station 12 allows the user of the mobile communication terminal 100 to communicate with other mobile communication terminals 100, or with users connected to the PSTN 16.

The mobile services switching center 14 routes calls to and from the mobile communication terminal 100 through the appropriate base station 12. Information concerning the location and activity status of the mobile communication terminal 100 is stored in a database which is connected to the MSC 14 so that the network can route communications to the base station that is currently servicing the mobile communication terminal 100.

The MSC 14 also is connected to a target location server 18. The function of the target location server 18 is to convert location data expressed in a particular format, such as a street address, to a geocoordinate that can then be used as hereinafter described. The target location server 18 includes a database for storing data that is needed to convert the location data to a geocoordinate. In this illustration, the communication network 10 is a digital cellular telephone network such as a network that operates according to TIA Standard IS-136.

Figure 2:
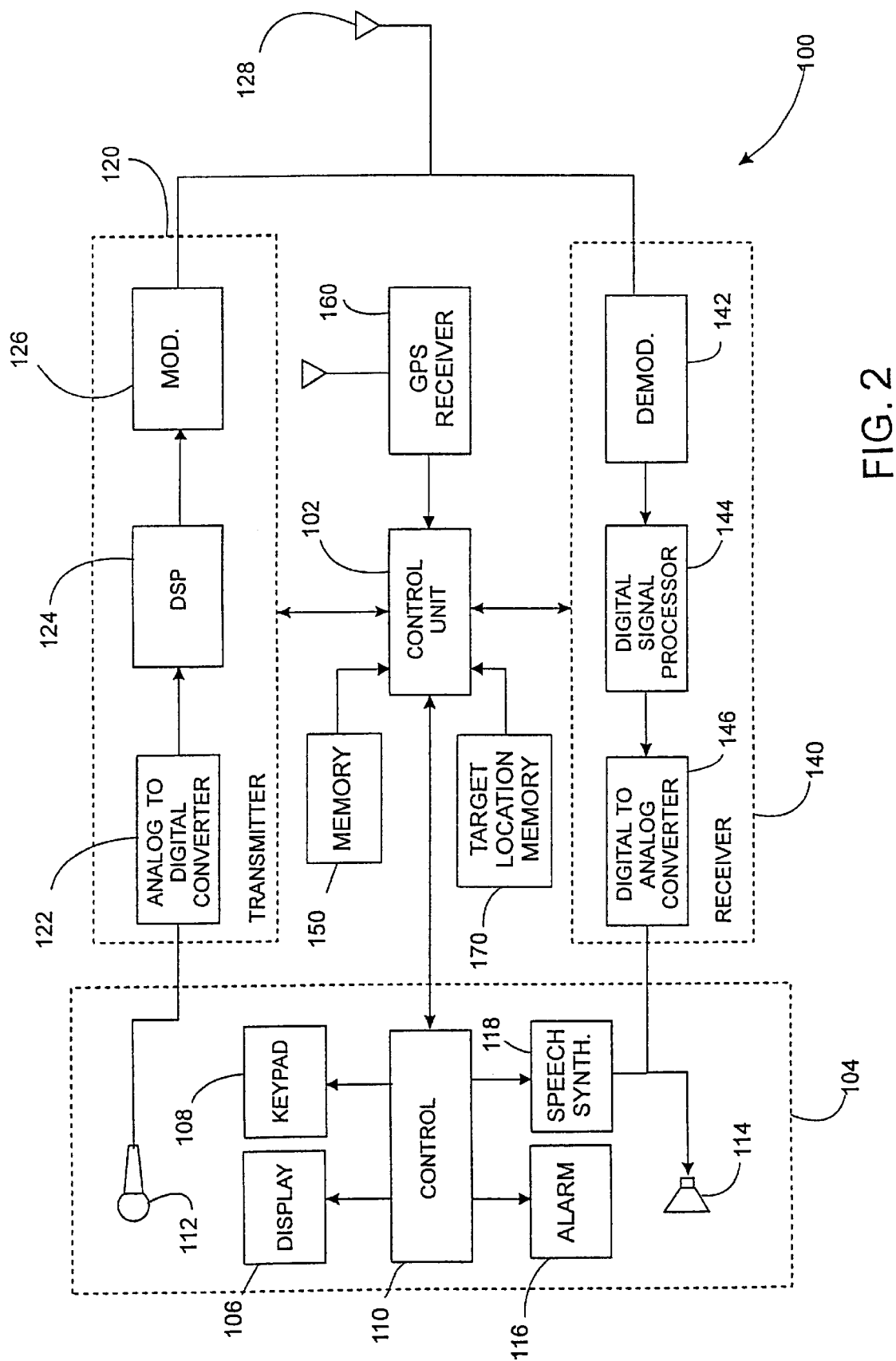
FIG. 2 is a block diagram of a mobile communication device of the present invention.

Referring now to FIG. 2, a mobile communication terminal of the present invention is shown and indicated generally by the numeral 100. The mobile communication terminal 100 shown in FIG. 1 is a fully functional radio transceiver capable of transmitting and receiving digital signals. Those skilled in the art will recognize, however, that the present invention may be implemented in an analog transceiver. The mobile communication terminal 100 includes a control unit or logic unit 102, an operator interface 104, a transmitter 120, a receiver 140, a memory 150, a positioning receiver 160, and a target location memory 170.

The operator interface 104 includes a display 106, keypad 108, control unit 110, microphone 112, speaker 114, alarm 116, and speech synthesizer 118. The display 106 allows the operator to see dialed digits and call status information. The keypad 108 allows the operator to dial numbers, enter commands, and select options. The control unit 110 interfaces the display 106 and keypad 108 with the control unit 102. The microphone 112 receives audio signals from the user and converts the audio signals to analog signals. Speaker 114 converts analog signals from the receiver 140 to audio signals that can be heard by the user. The alarm 116 produces an audible tone to notify the user of an incoming call, or when displaying or sending arrival messages as will be hereinafter described. The speech synthesizer 118 converts text messages to an audible signal that can be played back through the speaker 114.

The analog signals from the microphone 112 are applied to the transmitter 120. The transmitter 120 includes an analog-to-digital converter 122, a digital signal processor 124, and a modulator 126. The analog to digital converter 122 changes the analog signals from the microphone 112 into a digital signal. The digital signal is passed to the digital signal processor 124. The digital signal processor 124 compresses the digital signal and inserts error detection, error correction and signaling information. The compressed and encoded signal from the digital signal processor 124 is passed to the modulator 126. The modulator 126 converts the signal to a form that is suitable for transmission on a RF carrier.

The receiver 140 includes a demodulator 142, a digital signal processor 144, and a digital to analog converter 146. Received signals are passed to the demodulator 142, which extracts the transmitted bit sequence from the received signal. The demodulator 142 passes the demodulated signal to the digital signal processor 144 which decodes the signal, corrects channel-induced distortion, and performs error detection and correction. The digital signal processor 144 also separates control and signaling data from speech data. The control and signaling data is passed to the control unit 102. Speech data is processed by a speech decoder and passed to the digital-to-analog converter 146. The digital-to-analog converter 146 converts the speech data into an analog signal which is applied to the speaker 114 to generate audible signals which can be heard by the user.

The control unit 102, such as a programmed microprocessor, functions to coordinate the operation of the transmitter 120 and the receiver 140. Memory 150 stores the program instructions and data needed by the control unit 102 to control the communications terminal 100. The functions performed by the control unit 102 include power control, channel selection, timing, as well as a host of other functions. The control unit 102 inserts signaling messages into the transmitted signals and extracts signaling messages from the received signals. The control unit 102 responds to any base station commands contained in the signaling messages, and implements those commands. When the user enters commands via the keypad 108, the commands are transferred to the control unit 102 for action.

The positioning receiver 160 receives signals from a space-based or landbased station that transmits positioning data. For example, the positioning receiver 160 could be a GPS receiver. The received data is passed to the control unit 102 which uses the information to calculate the geographic location of the communication terminal 100.

The target location memory 170 is used to store one or more target locations and associated arrival messages for selected target locations. In general, each target location stored in memory is identified by geocoordinates or other position data. Additional data, such as the number of a receiving party to whom arrival messages are sent, can also be stored in the target location memory 170. The target location memory 170 can be an operational register within the control unit 102 or an address space in memory 150. The target location memory 170 could also be a separate RAM or ROM memory.

The mobile communication terminal 100 of the present invention periodically compares its current location to the target locations stored in the target location memory 170. When the mobile communication terminal 100 arrives at a specified target location, it will take some predetermined action. For example, the mobile communication terminal 100 could annunciate its arrival by activating an alarm, display an arrival message stored in memory to the user, or transmit the arrival message to another person. For purposes of this application, the term target location is not restricted to a single point, but can be considered a geographic area of some geometric shape, such as a circle, centered at a particular point. A mobile communication terminal 100 arrives at the target location when it is within the defined geographic area (e.g. within 2 miles of a designated center point).

Target location data (i.e. position data) can be input into target location memory 170 in a variety of ways that are well-known in the art. For example, target location data can be input using the mobile communication terminal's keypad 108 and display 106, or downloaded from a computer or other device using a built-in system connector or infrared port on the mobile communication terminal 100. The target location data can also be downloaded over the air interface.

Several methods can be used to obtain geocoordinates or other position data for a particular target location. One method is to drive to the target location and use the positioning receiver 160 to obtain geocoordinates or other position data for the target location. Another method would be to obtain the geocoordinates or other position data from a target location server 18 connected to the communication network 10. For example, FIG. 1 shows a target location server 18 connected to the MSC 14. The user enters a street address or other known address, which is transmitted to the base station 12 and forwarded via the MSC 14 to the target location server 18. The target location server 18 converts the address of the target location to geocoordinates. The geocoordinates are transmitted back to the base station 12 and transmitted to the mobile communication terminal 100. Another method is for the user to enter geocoordinates manually through keypad 108 after consulting a map having geocoordinates.

Figure 3:
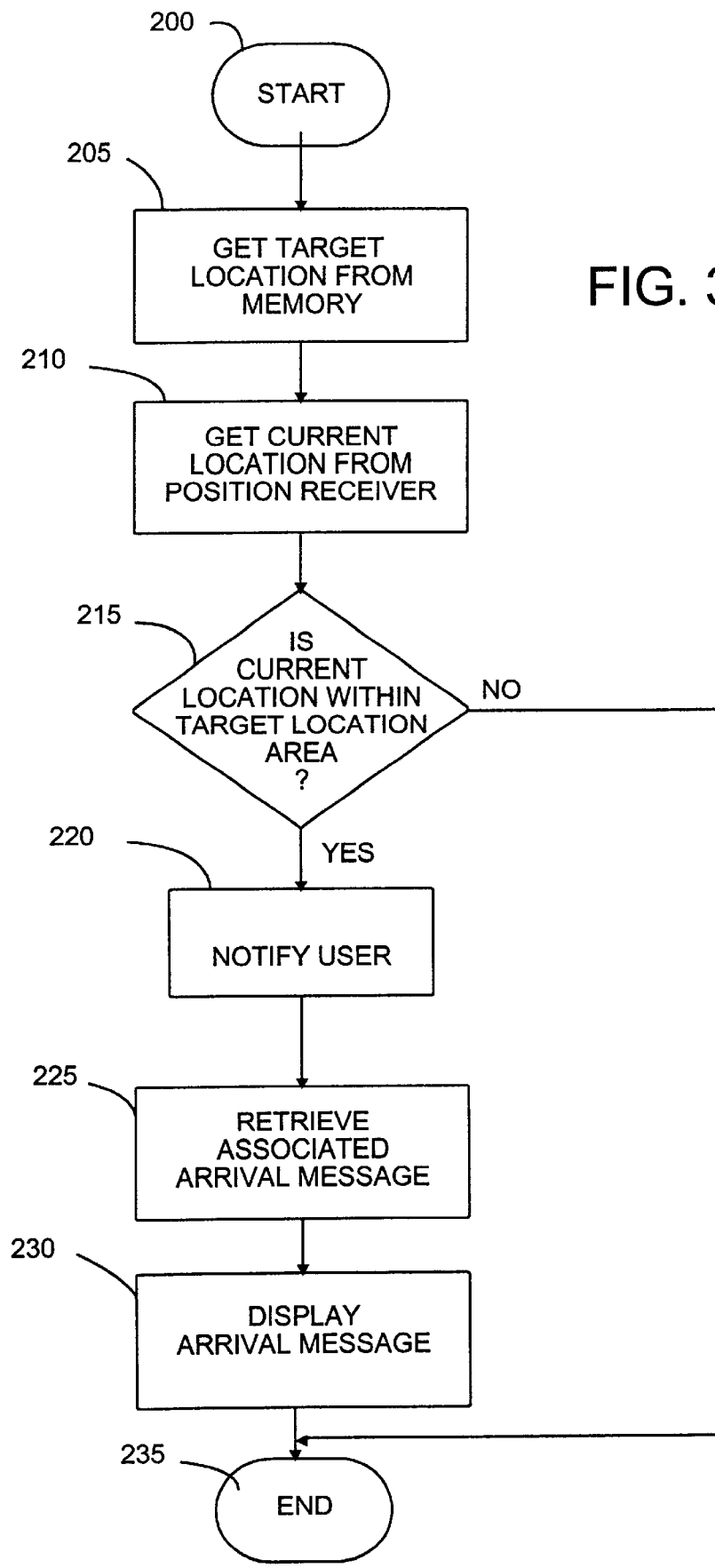
FIG. 3 is a flow diagram illustrating the operation of the mobile communication device.

FIG. 3 is a flow diagram illustrating the basic operation of the mobile communication terminal 100 of the present invention. As shown in FIG. 3, the mobile communication terminal 100 periodically compares its current location to the target locations stored in the target location memory 170. The mobile communication terminal 100 retrieves a target location list from the target location memory 170 (block 205) and gets its current location from the position receiver 140 (block 210). The mobile communication terminal 100 then compares the current location to each target location (block 215). If the mobile communication terminal 100 is within any target location in the target location memory 170, the mobile communication terminal 100 notifies the user, for example, by ringing the phone (block 220). The mobile communication terminal 100 then retrieves any arrival message stored in target location memory 170 associated with matching target location (block 225) and outputs the arrival message so that it can be read or heard by the user (block 230). For example, the message can be output to the display 106, or the speech synthesizer 118 can generate an audible message. If the current location does not fall within any target location stored in the target location list, then the procedure ends without any further action (block 235).

The mobile communication terminal 100 described in FIG. 3 is useful in an urban environment where target location can be specified by street addresses. The user can store arrival messages in the target location memory 170 which are displayed or played back upon arrival at the target location. For example, the user could store a message in the target location memory 170 to remind the user to stop at the grocery store when the user is in an area near the user's residence.

Figure 4:
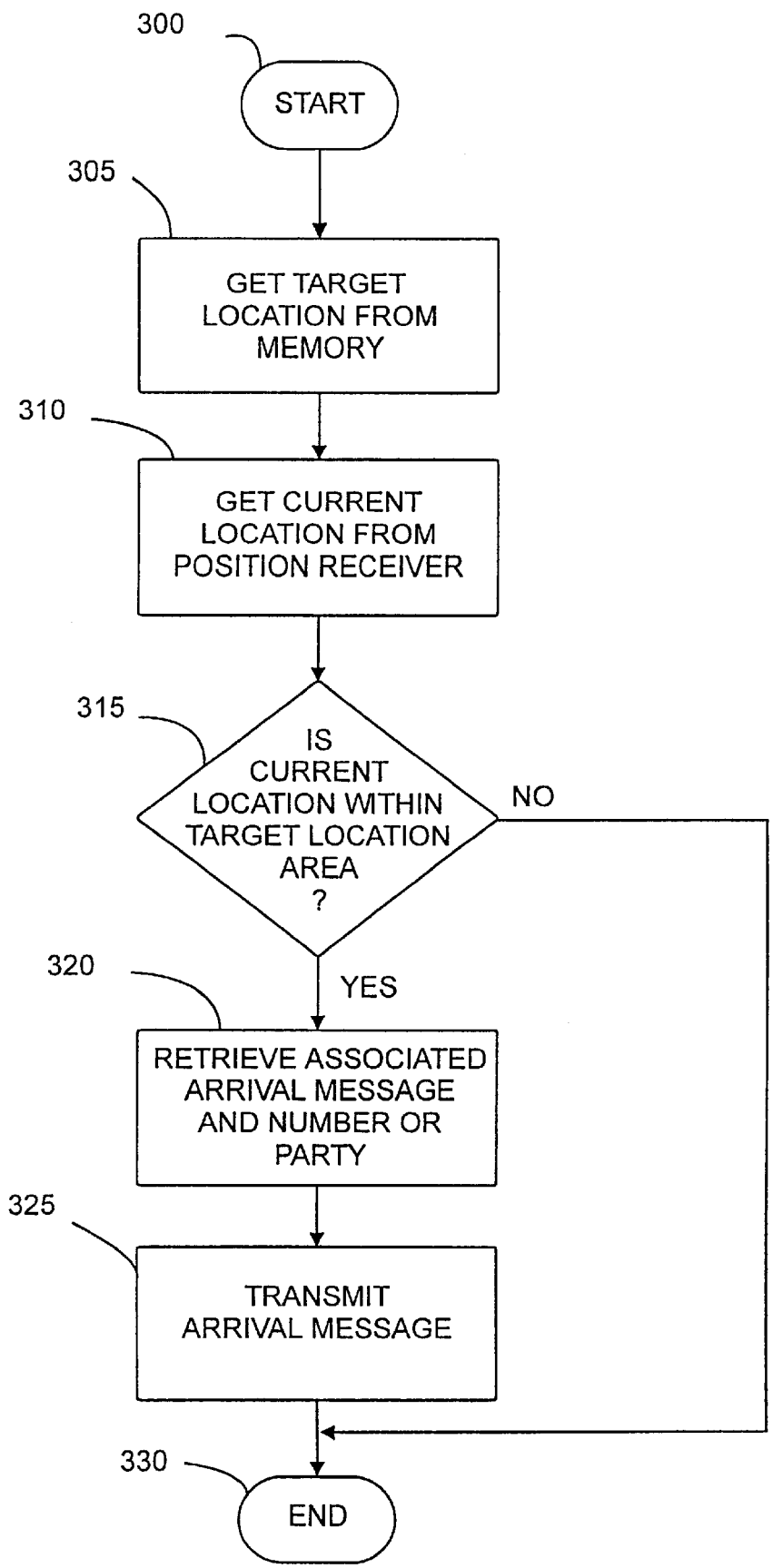
FIG. 4 is a flow diagram illustrating the operation of a second embodiment of the mobile communication device.

FIG. 4 shows the operation of an alternate embodiment of the mobile communication terminal 100. In this embodiment, the mobile communication terminal 100 is programmed to transmit a message to another party upon its arrival at one of the target locations stored in the target location list. The mobile communication terminal 100 periodically compares its current location to the target locations stored in the target location memory 170. The mobile communication terminal 100 retrieves a target location list from the target location memory 170 (block 305) and gets its current location from the position receiver 140 (block 310). The mobile communication terminal 100 then compares the current location to each target location (block 315). If the mobile communication terminal 100 is within any target location, the mobile communication terminal 100 retrieves the number of the party to be notified from the target location memory 170 and the corresponding arrival message (block 320). The mobile communication terminal 100 then formats and sends the arrival message using the SMS message facility (block 325). The message can optionally be displayed or played back to the user so that the user will know that a message has been sent. If the current location does not fall within any target location stored in the target location list, then the procedure ends without any further action (block 330).

The embodiment shown in FIG. 4 is useful to notify others when arriving at predetermined locations. For example, the mobile communication terminal 100 could be programmed to send a message to the user's spouse, parent, or other family member to inform a family member that the user has safely arrived at the target location.

Figure 5:
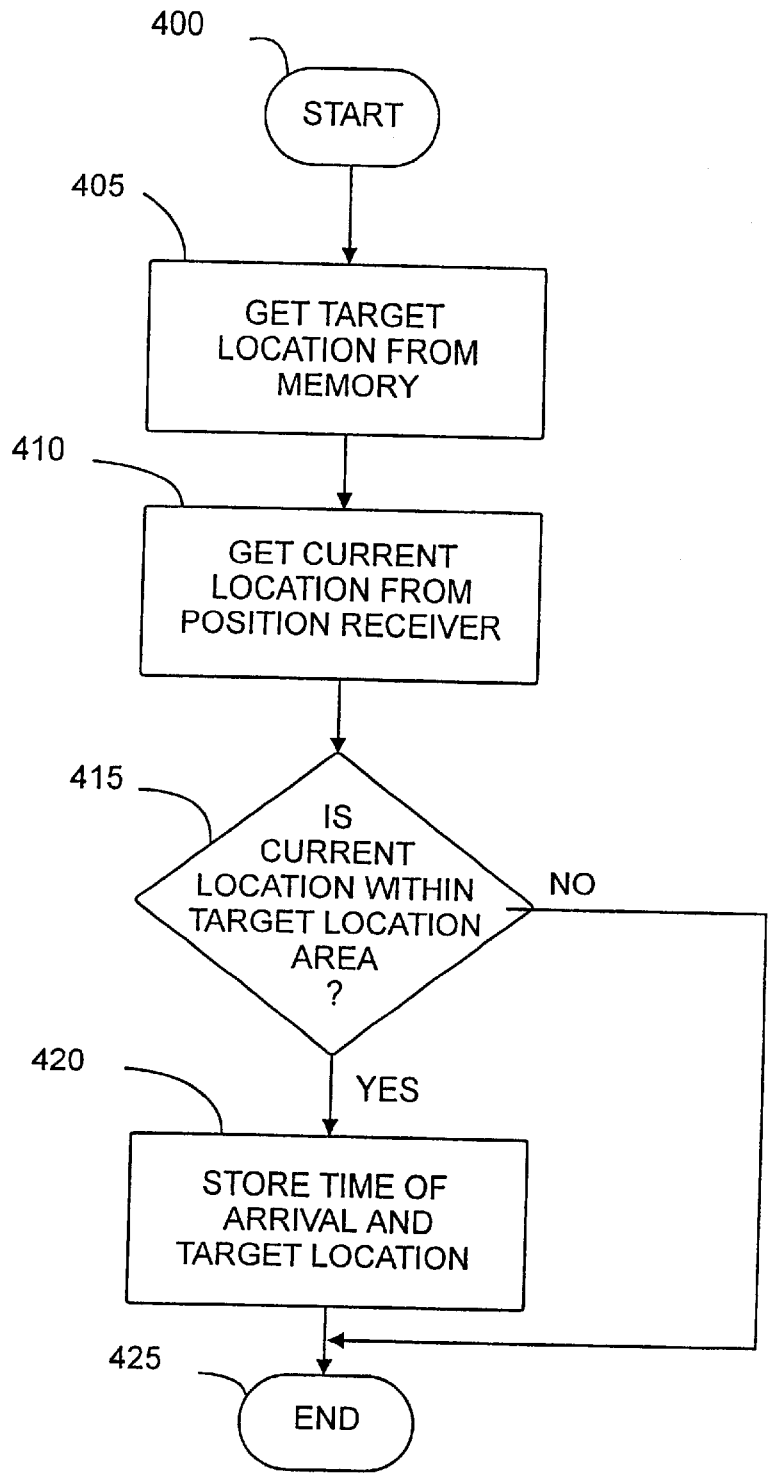
FIG. 5 is a flow diagram illustrating the operation of a third embodiment of the mobile communication device.

FIG. 5 shows a third embodiment of the invention. In this embodiment, the mobile communication terminal 100 creates a log of arrival times at predetermined target locations. The mobile communication terminal 100 periodically compares its current location to the target locations stored in the target location memory 170 as in the previous embodiments. The mobile communication terminal 100 retrieves a target location list from the target location memory 170 (block 405) and gets its current location from the position receiver 140 (block 410). The mobile communication terminal 100 then compares the current location to each target location (block 415). If the mobile communication terminal 100 is within any target location, the mobile communication terminal 100 records the time of arrival and the target location in memory (block 420) and ends (block 425). If the current location does not fall within any target location stored in the target location list, then the procedure ends without any further action (block 425). The mobile communication terminal 100 can also display an arrival message to the user, or transmit an arrival message to a third party as previously described. This embodiment of the invention is useful to persons who may need to keep a travel log, such as travelling salesmen.

In the examples given thus far, the mobile communication terminal 100 is programmed to take some action upon its arrival at a predetermined location. The same method can be used, for example, to display or send messages as the user travels away from a particular location. For example, a starting location can be stored in the target location memory. The mobile communication device 10 could monitor the distance traveled from the starting location and either display or send messages when a predetermined distance from the starting location is reached.

Although the present invention has been described in connection with a digital cellular telephone network filling the role of the communication network, the invention is not limited to such use, and applies to all kinds of wireless communication networks. The mobile communication devices can be radio transceivers with digital message capability, personal computers or personal digital assistants equipped with wireless modems, and the like. Additionally, the invention may be carried out in specific ways other than those set forth herein without departing from the spirit and the essential characteristics of the present invention. Consequently, the present embodiments are to be construed in all aspects as illustrative and not restrictive. All changes coming within the meaning and equivalence range of the appended claims are intended to be embraced by these claims.

What is claimed is:

1. A mobile communication device capable of displaying and/or sending user-defined arrival messages upon its arrival at a predetermined location, comprising:
    a. a memory for storing target location data identifying one or more target locations, and a corresponding arrival message for each of said target locations;
    b. a positioning receiver for determining the current location of the mobile communication device;
    c. a control unit operatively connected to said positioning receiver and said memory for comparing the current location of the mobile communication device to said target locations stored in said memory;
    d. output means responsive to said control unit for outputting an arrival message corresponding to selected target location stored in said memory when the current location matches said selected target location.

2. The mobile communication device according to claim 1 wherein said output means is a display for displaying said arrival message.

3. The mobile communication device according to claim 1 wherein said output means is a speech synthesizer for converting said arrival message to an audible signal.

4. The mobile communication device according to claim 1 wherein said output means is a transmitter for transmitting said arrival message to a remote location.

5. The mobile communication device according to claim 1 wherein said target location data comprises a set of target location coordinates corresponding to said target locations.

6. The mobile communication device according to claim 1 wherein said target location data is obtained from said positioning receiver.

7. The mobile communication device according to claim 1 further including a keypad and wherein said target location data is entered via said keypad.

8. The mobile communication device according to claim 1 further including a transceiver for communicating with a target location server to obtain said target location data.

9. A method for using a mobile communication device to deliver messages upon arrival at a predetermined location, comprising:
   a. storing target location data corresponding to one or more predetermined target locations in a target location memory and an associated arrival message for selected target locations;
   b. determining the current location of the mobile communication device;
   c. comparing said current location of the mobile communication device to said predetermined target locations stored in said target location memory;
   d. outputting an arrival message associated with a selected target location when the current location of said mobile communication device matches the selected target location.

10. The method according to claim 9 wherein the arrival message is displayed on a display associated with the mobile communication device.

11. The method according to claim 9 wherein the arrival message is converted to an audible message.

12. The method according to claim 9 wherein the arrival message is transmitted to a designated party.

13. The method according to claim 9 further including inputting said target location data into said target location memory.

14. The method according to claim 9 wherein the target location data is input by entering said target location data on a keypad.

15. The method according to claim 9 wherein the target location data is input from a positioning receiver.

16. The method according to claim 9 wherein the target location data is input from a target location server connected to a communications network.

17. A mobile communication device capable of displaying and/or sending messages upon its arrival at a predetermined location, comprising:
   a. a wireless transceiver for transmitting signals to and receiving signals from a remote station;
   b. a memory for storing target location data identifying one or more target locations;
   c. a positioning receiver for determining the current location of the mobile communication device;
   d. a control unit operatively connected to said transceiver, said memory, and said positioning receiver for comparing the current location of the mobile communication device to said target locations stored in said memory and performing a predetermined action when the current location matches one of said target locations.

18. The mobile communication device according to claim 17 further including an audible alarm operatively connected to said control unit for generating an audible signal when the current location matches one of said target locations.

19. The mobile communication device according to claim 17 further including a display operatively connected to said control unit for displaying a predetermined arrival message when the current location matches one of said target locations.

20. The mobile communication device according to claim 19 wherein said arrival message is a user-defined message.

21. The mobile communication device according to claim 20 wherein said arrival message is stored in said memory.

22. The mobile communication device according to claim 17 wherein said transceiver transmits a predetermined arrival message to a remote location under direction of said control unit when the current location of said mobile communication device matches one of said target locations.

* * * * *